Aug. 31, 1943.　　　　E. L. HEATH　　　　2,328,339
VEHICLE WHEEL LOCK
Filed Feb. 18, 1942

INVENTOR
EARL L. HEATH
BY
Wheeler, Wheeler, & Wheeler
ATTORNEYS.

Patented Aug. 31, 1943

2,328,339

UNITED STATES PATENT OFFICE 2,328,339

VEHICLE WHEEL LOCK

Earl L. Heath, Marinette, Wis.

Application February 18, 1942, Serial No. 431,329

12 Claims. (Cl. 70—259)

This invention relates to improvements in vehicle wheel locks.

It is the primary object of the invention to provide an emergency lock applicable to existing wheel structures for the purpose of securing against removal the hub caps which cover the wheel nuts. The removal of the tire is very difficult unless the wheel is first dismounted from the vehicle axle and hub by unscrewing the nuts to which the hub cap gives access. Therefore, by precluding removal of the hub cap, I am able to afford very material protection to the tires.

Existing wheels are provided with slot-like openings immediately within the rims to receive the straps of tire chains. It is a particular object of the present invention to provide a locking device having component parts readily receivable through these slots and readily locked to each other without requiring any special equipment or anything permanently affixed to the wheel. The device of the present invention is applicable without tools to any conventional vehicle wheel and in no way impairs or modifies the wheel structure and may, if desired, be removed at any time.

Other objects will be apparent from the following disclosure of my invention.

In the drawing.

Like parts are identified by the same reference characters throughout the several views.

Figure 1:
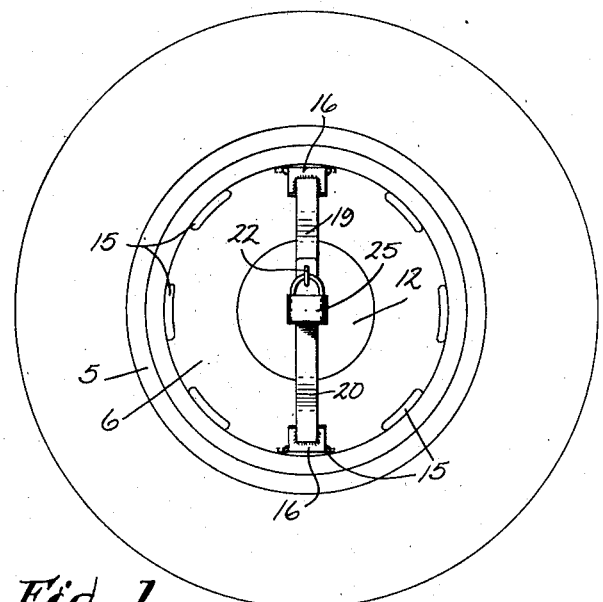
Figure 1 is a side elevation of a vehicle wheel equipped with my invention.

While there are many specifically different wheel structures on the market, the conventional wheel includes integrally or unitarily a rim 5 and an outwardly dished web 6 detachably connected to a hub 7 by means of nuts 8 which may secure the wheel either directly to the hub or to the brake drum 9. The web 6 provides a concave pocket at 10 in which the nuts are located, such pocket being covered by a detachable closure 12 in the form of a concave disk which is called a hub cap.

The web portion 6 of the wheel is provided at intervals about its periphery and immediately within the rim with a series of peripherally extending slots 15 which are adapted to receive the straps of tire chains. In accordance with the present invention, I mount two or more fittings in a corresponding number of these slots and lock their ends together across the hub cap. In the structure shown in Figures 1, 2 and 3, the fittings 16 are T-shaped, having shanks 17 roughly corresponding in width to the slots (to preclude any substantial lateral movement) and a head which has shoulder portions 18 much too wide to pass through the slots, the head being preferably somewhat inclined with reference to the shank 17.

Figure 2:
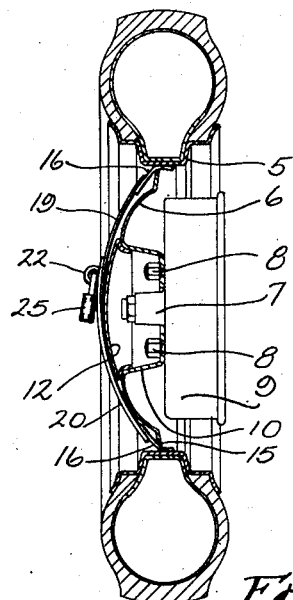
Figure 2 is a vertical axial section through the wheel shown in Figure 1.
Figure 3:
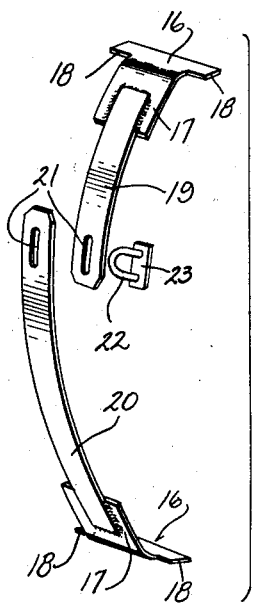
Figure 3 is a view in perspective on an enlarged scale showing the separate parts comprising my improved emergency lock.

For purposes of illustration, only two fittings are employed in the device as illustrated. More may be aded to any desired number. Each fitting, as shown in Figures 1, 2 and 3, has an extension strap. The extension strap from the upper fitting is designated by reference character 19 while that which extends up from the lower fitting is designated by reference character 20. Each of the straps is welded to the respective fitting. The straps are of such length that they overlap and in their overlapping ends there are registering slots 21 adapted to receive a hasp at 22 which is connected to a mounting plate 23 of any desired size. The only reason for placing the hasp on a separate mounting plate, rather than upon the hub cap 12, is to avoid marring the hub cap. The reason why the hasp is mounted on a separate plate 23 rather than upon one of the straps 19 or 20 is because the hasp, if mounted on the strap, would make it impossible to manipulate the strap through the extremely narrow slot 15 with which most conventional wheels are provided. Broadly, it is immaterial how the hasp is mounted so long as it cannot be drawn through the slots 21 and its inner end preferably bears on or over the hub cap to assist in securing the hub cap against unauthorized removal. With the slotted ends of the straps 19 and 20 in place over the hasp, a padlock 25 secures the assembly together. In the preferred embodiment, the padlock is located with its center of mass at the center of the wheel so as not to destroy the balance of the wheel. The padlock may be taped or otherwise secured in position to prevent rattling.

Figure 4:
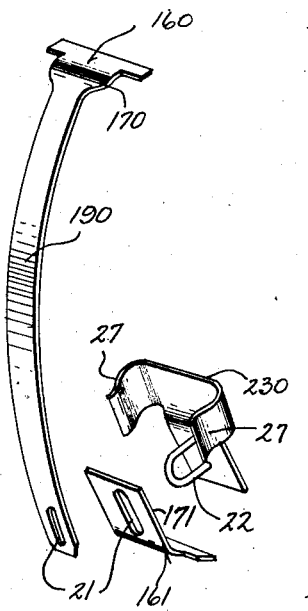
Figure 4 is a view similar to Figure 3 showing a slightly modified embodiment of the invention.

The wheel may already be unbalanced, in which case the padlock may be used as a weight to restore the wheel to balance. For this purpose, it may be located off center. The off center location may also be used in instances where balance is not important. In the modified embodiment shown in Figure 4, the fitting 160 and strap 190 are formed in one piece, the strap being a mere extension of the shank portion 170 of the fitting 160. The opposite fitting 161 has the slot 21 located directly in its shank portion 171, thus dispensing completely with strap 20. This embodiment of the invention also shows the hasp 22 provided with an enlarged mounting plate 230, one of the functions of which includes the extension of its sides at 27 to constitute a resilient spring clip for the retention of the body of the padlock. Any desired type of padlock may be used, such as that shown at 25 in Figure 1.

By means of the present invention, the hub cap 12 may be covered to any desired extent using any desired number of straps and fittings and a plate of any desired size to resist or preclude unauthorized access to the nuts which secure the demountable wheel. Because the device of the invention is applicable to existing wheels without injuring the appearance of the vehicle or requiring any permanent modification of its structure, it is particularly adapted for emergency use. I do not desire to be limited to details of the mechanism shown but contemplate in the appended claims that my invention be interpreted as broadly as the state of the art permits.

I claim:

1. An emergency anti-theft device for vehicle wheels having mounting nuts and a hub cap covering such nuts, said device comprising separate headed members having shank portions individually receivable from the rear through opposing tire chain slots of a conventional vehicle wheel and freely removable rearwardly therefrom when unlocked, and strap means extending between said members outwardly of the vehicle wheel and constituting the sole connection therebetween, together with means including a lock for securing said strap means in place diametrically of the vehicle wheel across the hub cap thereof whereby to secure the hub cap against unauthorized removal for exposing the wheel mounting nuts.

2. An emergency anti-theft device for vehicle wheels having web portions provided with slots and having mounting nuts covered by a hub cap, said device comprising a plurality of headed members with shank portions adapted to be manipulated through the slots of the wheel from the back, and means for securing said members together across the hub cap of the wheel to preclude removal thereof, said means including a hasp, a plate to which said hasp is mounted independently of said members, and slotted means through which said hasp is received and exposed for connection of a padlock thereto, said slotted means comprising an extension of one of said members.

3. In an emergency anti-theft device, a vehicle wheel having a rim, a web provided with peripheral slots immediately within the rim, and a pocket for mounting nuts provided with a hub cap closure, said device comprising a plurality of T-shaped fittings having heads engageable with said web and shanks receivable through the slots of the wheel web, straps connected with the respective fittings and adapted to be manipulated with said shanks through said slots, said straps being of such a length as to overlap across said hub cap and being provided with slots registering in the overlapping positions of said straps, a hasp independent of said straps and provided with means securing it against withdrawal through said slots, said hasp being of a length adapted to project through the registering slots of said straps to receive a padlock.

4. An emergency anti-theft device applicable without tools to a conventional vehicle wheel having a rim, a slotted web, a pocket for mounting nuts, and a hub cap constituting a closure for said pocket, said device comprising a plurality of separate anchorage members free of connection behind said web and thereby separately manipulatable through the slots of the wheel web from the rear thereof and individually headed to limit their movement forwardly through such slots, at least one of said members being of a length to span the wheel hub cap and said members having mutually overlapping portions together with means for locking said portions together.

5. An emergency anti-theft device for application to a vehicle wheel having a rim, a web slotted within the rim, and a pocket for mounting nuts provided with a hub cap closure, said device comprising a plurality of separate and independently manipulatable strap means individually receivable through spaced slots of the wheel web from the back of the wheel, heads thereon incapable of passage through said slots and thereby limiting their movement outwardly through the wheel, said strap means having terminal portions in lockable relation outside the wheel, and means including a lock completely detachable from said strap means for securing together the lockable portions of the strap means, said strap means being formed to extend across the hub cap closure directly between said heads and constituting the sole connection between said heads, all portions of the strap means being sufficiently smaller than the heads to pass freely through the wheel web slots through which said heads are incapable of passing.

6. An anti-theft device of the character described comprising a pair of slotted straps adapted for independent insertion through a slotted wheel from the rear and of such length as to be adapted for overlapping engagement of their slotted portions outwardly of a vehicle wheel, headed fittings at the ends of the straps engageable with the wheel at the rear, a hasp provided with a mounting plate independently of said straps, said hasp extending through the slots of the straps with said plate engaging one of the straps and a lock receivable into said hasp for engagement with the other straps for securing together the overlapping slotted ends thereof.

7. The device of claim 6 in which the relative length of the respective straps between the headed ends and the slots is such as to locate the lock substantially centrally of the wheel to which the straps are applied.

8. An anti-theft device for application to a vehicle wheel having a rim, a web slotted within the rim, and a pocket for mounting nuts provided with a hub cap closure, said device comprising a plurality of strap means individually receivable through spaced slots of the wheel web from the back of the wheel, heads thereon limiting their movement through the wheel, said strap means having mutually overlapping portions, and means including a lock completely detachable from said strap means, for securing together the overlapping portions of the strap means, together with a hasp separately detachable from said strap means, the strap means being slotted to receive the hasp and the hasp being headed to preclude its withdrawal through the slot when the lock is applied thereto.

9. The device of claim 6 in which the mounting plate for the hasp is provided with arms so positioned as to engage the lock between them, at least one of said arms being resilient whereby said arms constitute means with which said lock is releasably engaged for positioning the lock against displacement relative to said plate.

10. An anti-theft device of the character described comprising a pair of straps adapted for connection across the hub cap of a vehicle wheel to lock such hub cap in place, said straps having locking means wholly removable therefrom whereby to permit the straps to be projected from the rear through the narrow slots of a vehicle wheel, each of said straps being individually freely withdrawable from the wheel when unlocked, and each of the straps being individually provided unitarily with a head means angularly positioned to engage the rear of a vehicle wheel through which said straps project.

11. A anti-theft device of the character described applicable to a vehicle wheel having a hub cap, a rim, and a mounting web extending from the hub cap to the rim and provided with narrow peripheral slots immediately adjacent the rim, said anti-theft device comprising straps adapted for manipulation independently through the aforesaid slots from the rear of the wheel toward the front thereof and adapted to extend toward each other across the hub cap from opposite sides of the wheel, T-shaped heads individually provided upon the respective straps and engageable with the wheel at the rear, said heads being angularly disposed with respect to their respective straps whereby to adapt the straps to extend across the hub cap, and means for locking such straps in interconnection over the hub cap, said means including a lock completely removable from the straps whereby to permit of their manipulation through the aforesaid slots.

12. The device of claim 11 in which said locking means further includes a hasp headed for engagement with one of said straps, the several straps being provided with registering slots through which said hasp extends for engagement by said lock.

EARL L. HEATH.